United States Patent [19]

Takeuchi

[11] Patent Number: 5,297,686
[45] Date of Patent: Mar. 29, 1994

[54] BOTTLE WITH EAR
[75] Inventor: Setsuyuki Takeuchi, Nagano, Japan
[73] Assignee: A.K. Technical Laboratory, Inc., Japan
[21] Appl. No.: 25,823
[22] Filed: Mar. 3, 1993

Related U.S. Application Data

[63] Continuation of Ser. No. 814,112, Dec. 26, 1991, abandoned.

[30] Foreign Application Priority Data

Dec. 29, 1990 [JP] Japan .................. 2-406068
Dec. 29, 1990 [JP] Japan .................. 2-417079
Aug. 30, 1991 [JP] Japan .................. 3-077101

[51] Int. Cl.⁵ .......................................... B65D 23/10
[52] U.S. Cl. ........................ 215/100 A; 220/758; 220/769
[58] Field of Search ................ 215/1 C, 100 A; 220/94 R, 94 A, 758, 759, 768, 769

[56] References Cited

U.S. PATENT DOCUMENTS

| | | | |
|---|---|---|---|
| 3,610,671 | 10/1971 | Conger | 215/100 A X |
| 4,368,826 | 1/1983 | Thompson | 215/100 A |
| 4,372,454 | 2/1983 | Thompson | 215/100 A |
| 4,727,997 | 3/1988 | Nakamura et al. | 215/100 A |
| 4,832,216 | 5/1989 | Reyes | 215/100 A |
| 4,842,158 | 6/1989 | Reyes, Jr. | 220/94 R |
| 4,964,522 | 10/1990 | Umetsu et al. | 215/100 A |

FOREIGN PATENT DOCUMENTS 2174669 11/1986 United Kingdom .

Primary Examiner—Stephen P. Garbe
Attorney, Agent, or Firm—Ostrolenk, Faber, Gerb & Soffen

[57] ABSTRACT

A bottle with an ear obtained by orientation blow molding, in which a mounting portion positioned at a predetermined height has a large diameter and upper portion composed of an outer wall in the form of an injection molded flange and an inner wall oriented internally thereof and placed in close contact therewith. The mounting portion having a predetermined width in an outer periphery thereof, is formed below a mouth portion of the bottle by injection orientation blow molding. An upper edge of the mounting groove is formed to have an edge having a plurality of notches at equal intervals. A mounting ring is internally provided with a plurality of projecting surfaces positioned at the mounting groove through the notches and is formed integral with a bended end of an ear. The projecting surfaces of the mounting ring and the upper edge of the mounting groove are fitted with each other whereby the ear and the bottle are integrally connected.

12 Claims, 5 Drawing Sheets

BOTTLE WITH EAR

This is a continuation of application Ser. No. 07/814,112, filed Dec. 26, 1991, now abandoned.

BACKGROUND OF THE INVENTION (1) Field of the Invention

This invention relates to a bottle with an ear made of synthetic resin prepared by injection orientation blow molding.

(2) Prior Art

In a bottle molded by injection molding a preform, and orientation blow molding portions other than a mouth portion of the preform into a thin wall-thickness configuration while holding the mouth portion, it is technically difficult to mold a part of the preform into an ear during orientation blow molding, unlike normal blow molding. Therefore, in case of mounting an ear, the ear is molded below the mouth portion integral with the preform.

Molding of such a bottle can be achieved by a cold parison system which molds a preform using a normal injection mold to mold the preform into a bottle by an orientation blow molding machine. However, this has been difficult to employ in the case of a hot parison system in which an operation from injection molding of a preform to orientation blow molding is carried out by a single apparatus.

In view of the foregoing, an attempt has been made to mount an ear after a bottle has been molded. In this case, however, a position at which an ear is mounted is limited to a portion above a support ring.

Therefore, the mouth portion of the bottle with an ear is formed longer than that of a normal bottle and a position at which an ear is mounted is high. Therefore, particularly in a large bottle, it is difficult to incline the bottle while holding the ear, often wanting in smooth pouring of contents.

Such a problem as just mentioned can be solved by an arrangement wherein a lower side of a mouth is formed to have a large diameter, and threads are provided in the outer periphery of the large diameter portion, to which the ear is threadedly mounted, as disclosed in British Registered Design No. 1,039,436. However, with injection orientation blow molding, it is impossible to orient blow mold portions approaching the large diameter portion without impairing the dimension of the thread formed in the outer peripheral side.

In injection orientation blow molding, the thread of the mouth portion, the support ring and the like remain injection molded with a view to maintaining molding accuracy. The wall portion made thin by the orientation blow molding is carried out from the underside of the support ring. For this reason, in the case where a large diameter portion having threads is formed below the support ring to threadedly mount an ear thereon, portions approaching the large diameter portion to remain thick-walled resulting from injection molding. As a result, the use of material per bottle increases, thus increasing cost.

Orientation blow molding has the merit in that since portions other than the mouth portion can be molded to have a thin wall-thickness, there can be obtained a bottle which is lighter than that obtained by the normal blow molding and is excellent in falling strength, because of which an increase of non-oriented portions left to be thin in wall-thickness is not unprefereable, and accordingly, a position of a large diameter portion at which an ear is mounted is limited to a portion near the mouth portion.

Moreover, mounting of an ear by means of a screw causes the ear to be easily loosened due to vibrations or the like, and a lower end of the ear is not connected to the body of a bottle and in a state in which the ear is easily disengaged. When the bottle is inclined to pour the contents, the load is concentrated on a bended portion at the upper portion of the ear to generate a flexture thereat. In case of an ear made of synthetic resin, a gripping portion thereof is separated.

SUMMARY OF THE INVENTION

According to the present invention, an ear is mounted on a molded bottle later. A mounting portion of the ear is molded to have a thin wall-thickness and mounted below a support ring whereby a position of the ear mounting portion can be set downwardly. This solves the problem encountered in a conventional bottle with an ear in which the mounting position is apt to be limited to a portion near the mouth portion.

Furthermore, according to the invention, a mounting portion to be located at a predetermined height which is larger in diameter than that of a mouth portion and of which upper edge is formed to be edged is subjected to orientation blow molding. The upper edge maintains its injection molded state and the upper edge and a ring member formed integral with a base end of the ear are fitted to each other whereby the ear is mounted positively and unable to be loosened, thus solving the problem encountered in a conventional bottle with an ear.

Moreover, according to the present invention, an ear is mounted on a molded bottle later, but a lower end of the ear can be firmly fixed to the body of the bottle by extremely simple means, thus solving the problem encountered in a conventional bottle with an ear in which a gripping portion thereof is opened due to the load when the bottle is inclined.

According to a feature of the present invention for achieving the aforesaid objects, there is provided an arrangement wherein a mounting portion positioned at a predetermined height which has a large diameter and a mounting groove having a predetermined width in an outer periphery thereof, is formed below a mouth portion of a bottle by injection orientation blow molding. An upper edge of the mounting groove includes a plurality of notches formed at equal intervals. A mounting ring internally provided with a plurality of projecting surfaces positioned at the mounting groove through the notches and formed integral with a bended end of an ear. The projecting surfaces of the mounting ring and the upper edge of the mounting groove are fitted with each other whereby the ear and the bottle are integrally connected.

According to a further feature of the present invention, the upper portion of the ear mounting portion is composed of an outer wall of a flange injection molded below the mouth portion and an inner wall internally oriented and placed in close contact. The upper edge fitted into the mounting ring is formed so as to be edged by an acute lower edge of the flange.

According to another feature of the present invention, the lower end of the ear mounted on the bottle is attached to the side of the body by means of a heat-shrinkable band fitted around the body of the bottle.

In the bottle with an ear as described above, since the mounting portion of the ear is formed to have a large diameter, the insertion of a mounting ring is not impaired by the threads in the outer periphery of the mouth portion and the support ring, but when the ear side is slightly turned, the upper edge of the mounting groove formed to have an edge and the upper edge of the projecting surface internally of the mounting ring are firmly engaged with each other. Therefore, mounting is simpler than in the case which relied upon engagement between threads. Even if a load is imposed on the engaging portion, the ear is not disengaged unless the mounting ring is broken.

Moreover, only the upper portion of the ear mounting portion is composed of a flange, injection molded below the mouth portion and a wall portion oriented internally thereof and placed in close contact therewith. The other portions are subjected to orientation blow molding. Therefore, the ear can be formed to have a thin wall-thickness configuration as compared with the case where the whole mounting portion is subjected to injection molding. The upper portion has a strength due to the orientation of the inner wall portion, and a molding position thereof is not limited to a portion near the mouth portion.

Furthermore, since the lower end of the ear is attached to the side of the body by means of a heat-shrinkable band fitted around the body of the bottle, when the bottle is inclined, the load is not concentrated on only the upper portion of the ear by the integration of the lower end of the ear and the body. In addition, the gripping portion is not opened due to the load, and therefore, even a large bottle which is heavy because of the contents can be easily handled.

The present invention will be described in detail by way of embodiments shown in the accompanying drawings.

BRIEF DESCRIPTION OF THE DRAWINGS

The drawings show embodiments of a bottle with an ear according to the present invention.

MODE OF PREFERRED EMBODIMENTS

Figure 1:
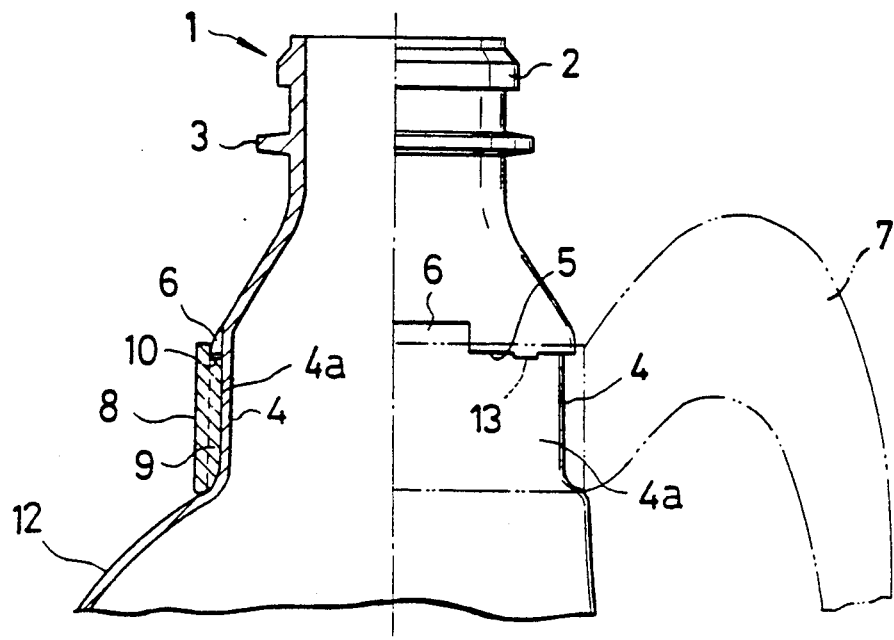
FIG. 1 is a longitudinal sectional side view of an upper half portion of a bottle.
Figure 2:
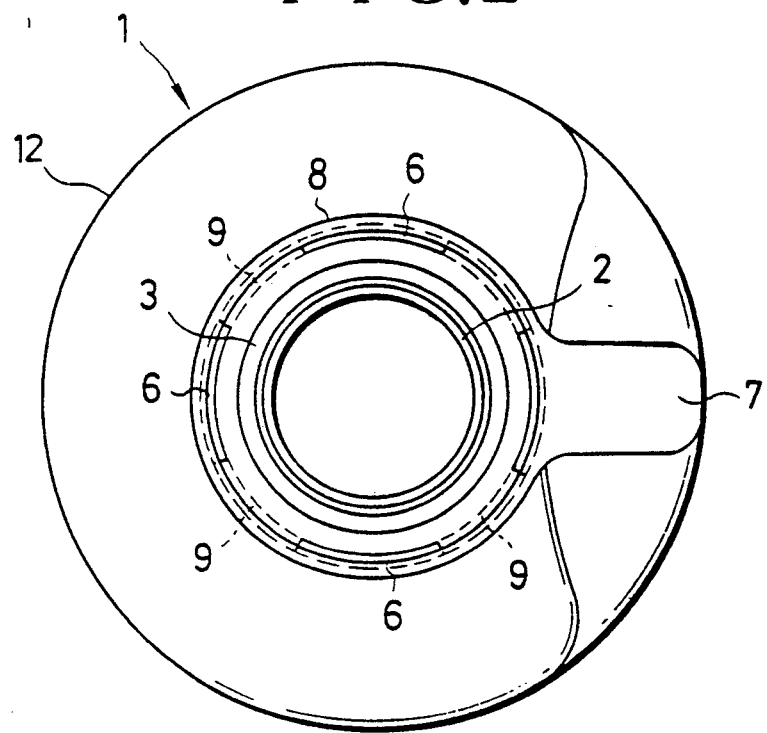
FIG. 2 is a plan view of a bottle.
Figure 3:
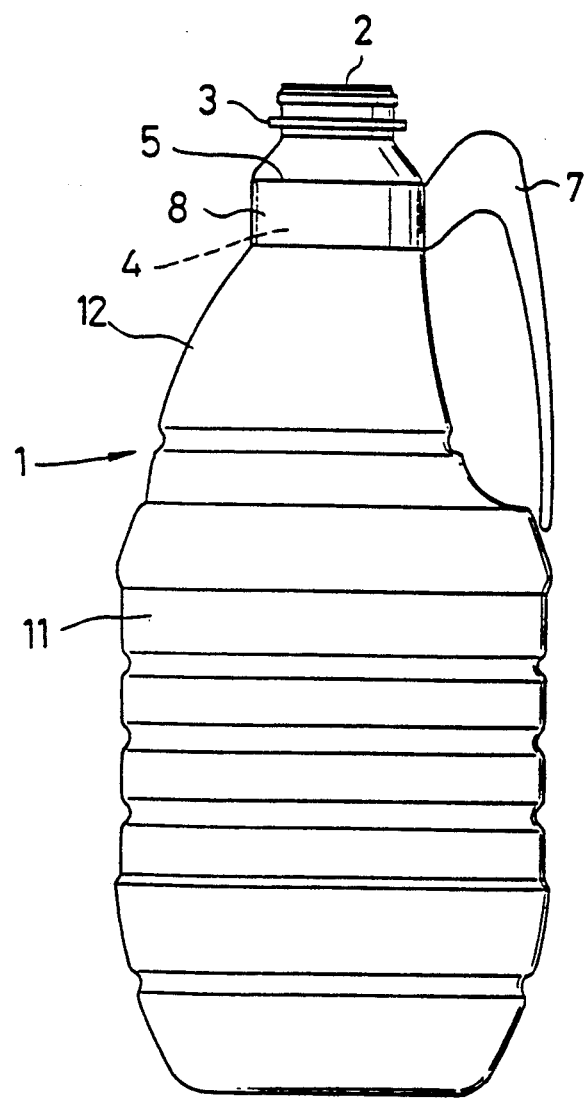
FIG. 3 is a side view of a bottle.

In the drawings, reference numeral 1 designates a bottle form of polyethyleneterephtalate (PETP) subjected to injection orientation blow molding. A support ring 3 is provided below a mouth portion 2.

A portion continuous to a body 11 below the support ring 3 of the bottle 1 is formed with an ear mounting portion 4 positioned at a predetermined height which is larger in diameter than the support ring 3, and a mounting groove 4a having a predetermined width is formed in the outer periphery thereof.

The lower edge of the mounting groove 4a is connected to a curve portion of a shoulder 12 which forms an upper portion of the body 11, and an upper edge 5 is formed to be edged. At four locations of the upper edge 5, there are formed inserting notches 6 at equal intervals.

Reference numeral 7 designates an ear formed of PETP, at an end of which is integrally formed a mounting ring 8. The mounting ring 8 is internally formed with four projecting surfaces 9 corresponding to the notches 6, and the upper edge of the projecting surfaces 9 is formed into a shoulder 10 which is fitted into the upper edge 5 of the mounting groove 4a.

The upper edge of the projecting surfaces 9 is provided with a recess 14 which is fitted into an attachment mechanism 13 projected on the upper edge 5 of the mounting groove 4a to prevent a lateral deviation of the mounting ring 8.

Figure 7:
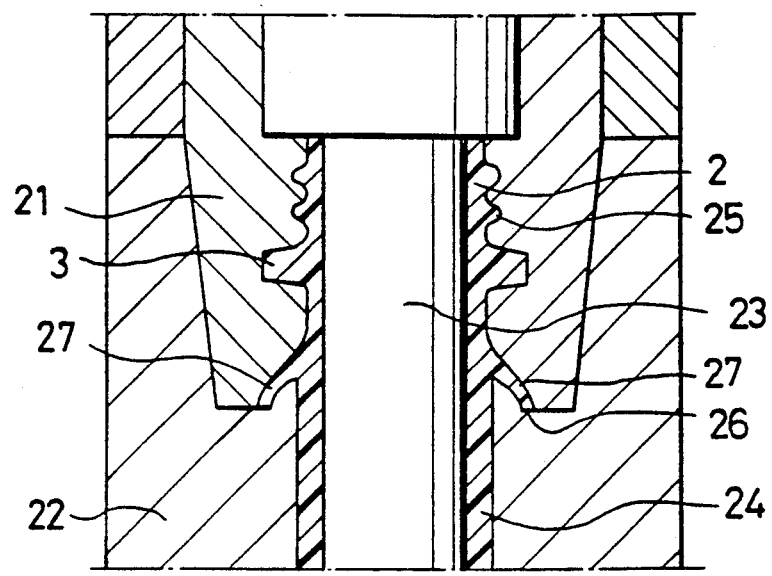
FIG. 7 is a sectional view of essential parts of an injection mold for explaining the injection molding step of an upper edge of an ear mounting portion.
Figure 8:
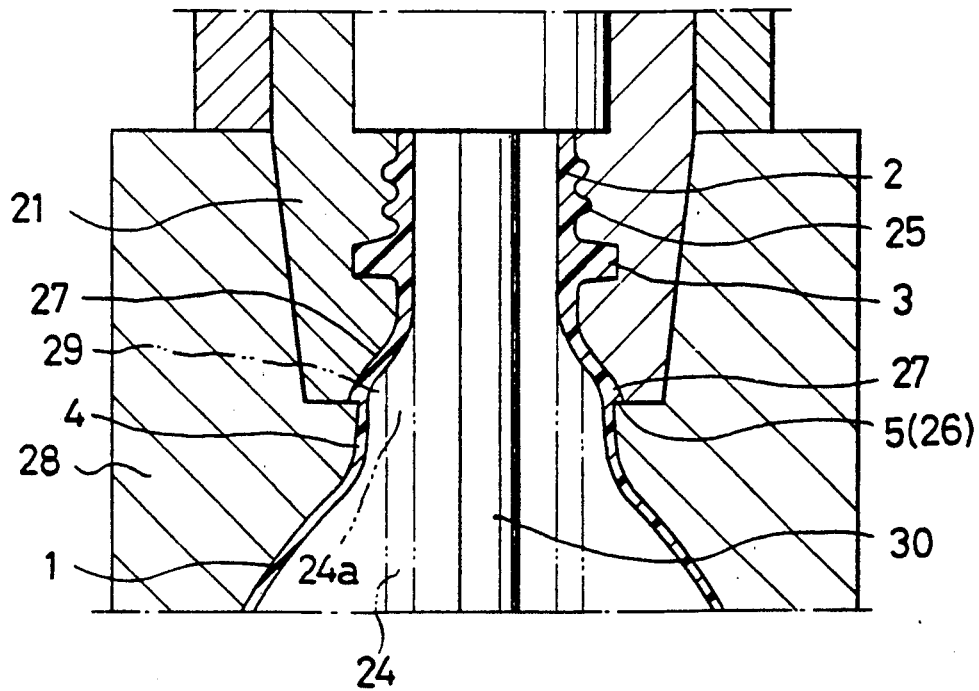
FIG. 8 is a sectional view of essential parts of a blow mold for explaining the blow molding step of an ear mounting portion and an upper edge.

The upper edge 5 of the mounting groove 4a is formed from an injection molded member. FIGS. 7 and 8 explain the molding steps therefor. First, when a neck mold 21, a cavity mold 22 and a core mold 23 are closed to injection mold a preform 24. A flange 27 whose lower edge 26 is acute along with threads 25 in the outer periphery of the mouth portion 2 and the support ring 3 are inwardly integrally molded below the mouth portion by making use of a parting portion between the neck mold 21 and the cavity mold 22.

After the injection molding, the preform 24 is held by the neck mold 21 above the flange 27 and transported to the blow mold 28, where the molds are closed. Thereby, the preform body below the lower edge 26 of the flange 27 is positioned at the blow cavity. Within the blow cavity, a space 29 is formed between the inside of the flange and the wall portion 24a of the preform indicated at the phantom line.

Next, air blowing is carried out while longitudinally orienting the preform 24 by means of an orientation rod 30, the preform body is longitudinally oriented from the end of the flange 27 and also laterally expanded to form a bottle 1 having an ear mounting portion 4 having a large diameter below the flange. In this bottle 1, the preform wall portion 24a internal of the flange is extended to have a thin wall-thickness coming into close contact with the inside of the flange by the space 29 internal of the flange 27, and a constriction thereunder constitutes mounting groove 4a.

Thereby, the flange 27 forms an upper outer wall of the ear mounting portion 4 of the bottle 1, and the lower edge 26 forms the upper edge 5 formed to be edged so that the ear mounting portion 4 has an upper portion composed of an outer wall subjected to injection molding and an oriented inner wall with, other portions being formed of thin walls by way of orientation blow molding.

While molding of notches 6 of the upper edge 5 is omitted in this step, it is to be noted that the notches 6 can be molded during molding of the flange.

In the above-described construction, the mounting ring 8 is placed over the mounting groove 4a from the mouth portion. Next, positioning between the notches 6 and the projecting surfaces 9 internally of the mounting ring is accomplished, after which the mounting ring 8 is forcibly turned. Then the projecting surfaces 9 are positioned under the upper edges 5 and firmly fitted.

As a result, the ear 7 is mounted on the side of the bottle. The ear 7 is not disengaged from the bottle 1 unless the bottle 1 is held and the ear 7 is forcibly deviated laterally.

Figure 4:
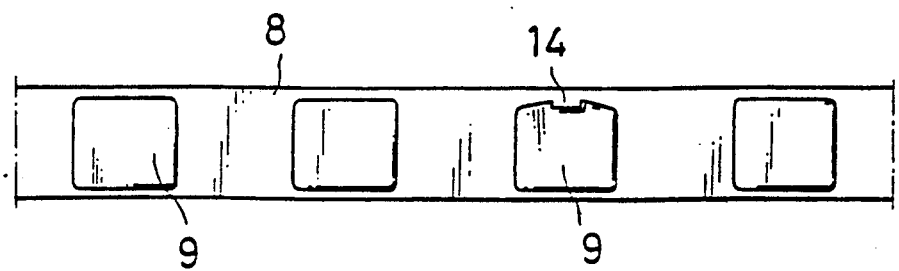
FIG. 4 is a developed view of a mounting ring.
Figure 5:
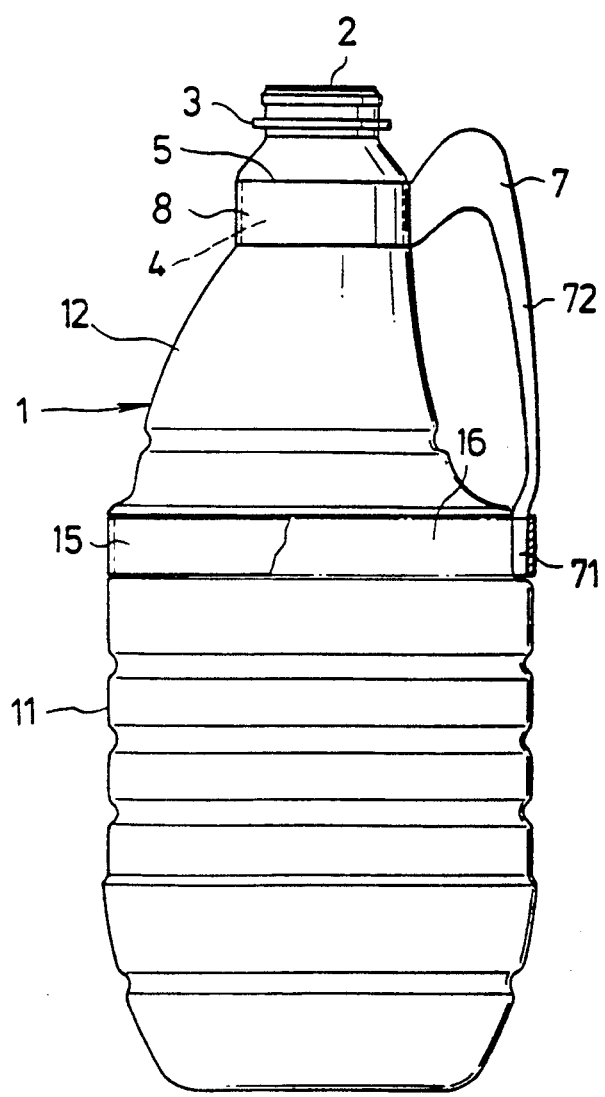
FIG. 5 is a side view of a bottle with an ear in which a lower end of the ear is attached to a body of the bottle.
Figure 6:
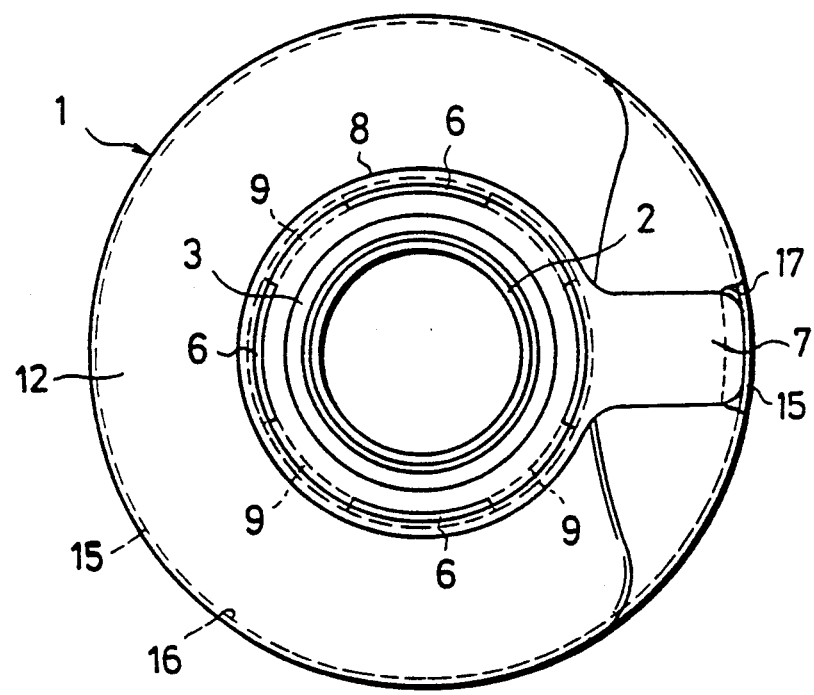
FIG. 6 is a plan view of FIG. 5.

FIGS. 4 and 5 show a bottle in which a lower end 71 of the ear 7 is integrally attached to the body using a heat-shrinkable band 15.

The heat-shrinkable band 15 is formed of PETP or the like. The band 15 before being shrunk is larger in diameter than the body, and after the ear 7 has been mounted on the bottle 1, the band 5 is fitted from the top of the bottle into an annular groove 16 formed around the body.

A portion of the annular groove 16 at which a lower end 71 of the ear 7 is positioned is formed with a recess 17. The heat-shrinkable band 15 is internally formed with a partial gap by the presence of the recess 17. The aforesaid lower end 71 is positioned at the gap, and the lower end 71 is firmly attached to the body due to the reduction in diameter of the heat-shrinkable band 15 caused by heating.

In mounting the ear 7, the mounting ring 8 is placed over the mounting groove 4, and the notches 6 and the projecting surfaces 9 internal to the mounting ring are adjusted in position and the ear 7 is inserted, after which the mounting ring 8 is forcibly turned, in a manner similar to the case shown in FIG. 1. Then, when the heat-shrinkable ring 15 is placed over the annular groove 16 and the ring 15 is heated by a conventional tunnel type heating device, the heat-shrinkable band 15 is reduced in diameter due to the shrinkage and placed in close contact with the body 11, and the lower end 71 of the ear 7 is pulled toward the body 11 due to the shrinking force and firmly attached.

In the bottle 1 as described above, the lower end 71 of the ear 7 is also attached to the body 11 by means of the heat-shrinkable band 15. Therefore, the load is not concentrated on the upper portion of the ear as so experienced in the past, and when the bottle 1 is inclined, a gripping portion 72 is not separated from the bottle due to the load. Therefore, the contents are easily poured as compared with the case where an ear is merely mounted on the mouth portion, and even a heavy large bottle is easily handled.

What is claimed is:

1. A bottle with an ear, comprising:
   a mouth portion;
   a body disposed below said mouth portion;
   a mounting groove formed at a predetermined height on said body at a location spaced from said mouth portion, said mounting groove having a predetermined diameter and an upper edge formed of a plurality of notches spaced at equal intervals; and
   a mounting ring formed integrally with an end of said ear, said mounting ring being positioned on said mounting groove, said mounting ring having an inner side provided with a plurality of projecting surface facing said mounting groove, the projecting surfaces of said mounting ring being fitted under the upper edge of said mounting groove to secure the ear to the bottle, wherein each of the projecting surfaces of the mounting ring have an upper edge provided with a recess which is fitted into a corresponding attachment projection on the upper edge of the mounting groove to prevent a lateral deviation of the mounting ring.

2. A bottle with an ear according to claim 1, wherein the upper edge of the mounting groove is composed of an injection molded flange disposed below the mouth portion, and wherein the upper edge of the mounting groove, under which the mounting ring is fitted, is formed by an acute lower end edge of the flange.

3. A bottle with an ear according to claim 1, wherein the mounting groove has a lower edge which is continuous to a curve of a shoulder which forms an upper portion of the body.

4. A bottle with an ear according to claim 1, wherein the bottle and the ear are formed of the same material.

5. A bottle with an ear according to claim 1, wherein after the ear has been mounted on the bottle, a lower end of the ear is attached to a side of the body by a heat-shrinkable band fitted around the body of the bottle.

6. A bottle with an ear according to claim 5, wherein the heat-shrinkable band and the bottle are formed of the same material.

7. A bottle with an ear according to claim 1, further comprising a support ring disposed at said mouth portion.

8. A bottle with an ear according to claim 7, wherein said predetermined diameter of said mounting groove is larger than a diameter of said support ring.

9. A bottle with an ear, comprising:
   a mouth portion;
   a body disposed below said mouth portion;
   a mounting groove formed at a predetermined height on said body at a location spaced from said mouth portion, said mounting groove having a predetermined diameter and an upper edge formed of a plurality of notches spaced at equal intervals; and
   a mounting ring formed integrally with an end of said ear, said mounting ring being positioned on said mounting groove, said mounting ring having an inner side provided with a plurality of projecting surfaces facing said mounting groove, each of the projecting surface of said mounting ring being fitted under the upper edge of said mounting groove to secure the ear to the bottle, each of the projecting surfaces having a recess which is fitted into a corresponding attachment projection on the upper edge of the mounting groove to prevent a lateral deviation of the mounting ring.

10. A bottle with an ear according to claim 9, wherein the heat-shrinkable band and the bottle are formed of the same material.

11. A bottle with an ear according to claim 9, wherein, after the ear has been mounted on the bottle, a lower end of the ear is attached to a side of the body by a heat-shrinkable band fitted around the body of the bottle.

12. A bottle with an ear according to claim 11, wherein the heat-shrinkable band and the bottle are formed of the same material.

* * * * *